(12) United States Patent
Tian

(10) Patent No.: US 11,444,468 B2
(45) Date of Patent: Sep. 13, 2022

(54) BALANCED CHARGING DEVICE AND CHARGING SYSTEM HAVING INTEGRATED PORTS

(71) Applicant: Shanghai Autoflight Co., Ltd., Shanghai (CN)

(72) Inventor: Yu Tian, Hong Kong (CN)

( * ) Notice: Subject to any disclaimer, the term of this patent is extended or adjusted under 35 U.S.C. 154(b) by 0 days.

(21) Appl. No.: 17/396,731

(22) Filed: Aug. 8, 2021

(65) Prior Publication Data

US 2022/0045522 A1 Feb. 10, 2022

(30) Foreign Application Priority Data

Aug. 7, 2020 (CN) .......................... 202021638153.6

(51) Int. Cl.
*H01M 10/46* (2006.01)
*H02J 7/00* (2006.01)

(52) U.S. Cl.
CPC .......... *H02J 7/0014* (2013.01); *H02J 7/0042* (2013.01); *H02J 7/0048* (2020.01); *H02J 7/007182* (2020.01)

(58) Field of Classification Search
CPC ...... H02J 7/0014; H02J 7/0048; H02J 7/0042; H02J 7/007182; H02J 7/0018

USPC .......... 320/107, 104, 116, 118, 119, 132, 148
See application file for complete search history.

(56) References Cited

U.S. PATENT DOCUMENTS

| 2006/0097696 A1* | 5/2006 | Studyvin | ............... | H02J 7/0018 320/116 |
| 2011/0234165 A1* | 9/2011 | Palatov | ................. | H02J 7/0018 320/119 |

\* cited by examiner

*Primary Examiner* — Edward Tso
(74) *Attorney, Agent, or Firm* — WPAT Law, P.C.; Anthony King

(57) ABSTRACT

A balanced charging device and a charging system used to solve the technical problem of too long charging time of the balanced charging device. The balanced charging device comprises a plurality of charging modules, each of which independently charges a battery unit and is provided with a positive port and a negative port with independent functions; the positive port is connected with the positive port of the battery unit corresponding to the charging module, and the negative port is connected with the negative port of the battery unit corresponding to the charging module. The charging system includes the balanced charging device. The balanced charging device and charging system provided by the disclosure are used for charging a plurality of battery units in series.

9 Claims, 4 Drawing Sheets

BALANCED CHARGING DEVICE AND CHARGING SYSTEM HAVING INTEGRATED PORTS

FIELD OF THE DISCLOSURE

The disclosure relates to the technical field of charging, in particular to a balanced charging device and a charging system.

BACKGROUND OF THE DISCLOSURE

The balanced charging device refers to a charging management device that charges a plurality of battery units in series to ensure that the power of each battery unit can be maintained consistent upon completion of charging. Using the balanced charging device to charge a plurality of battery units in series can extend the battery service life and shorten the charging time.

The existing balanced charging device includes a plurality of charging modules, each of which is used to charge a battery unit. There is a common wire in each adjacent two charging modules, and such common wire is connected with the positive port of one charging module and the negative port of the other charging module simultaneously so as to simplify the circuit structure.

However, the existence of the common wire will cause the charging module corresponding to the battery unit that finishes charging earlier to frequently start and end charging, resulting in too long charging time of the balanced charging device.

SUMMARY OF THE DISCLOSURE

In view of the above problems, the embodiment of the disclosure provides a balanced charging device and charging system used for shortening the charging time.

In order to achieve the above purpose, the disclosure provides the following technical solution:

The first aspect of the disclosure provides a balanced charging device for charging a plurality of battery units in series, which comprises: a plurality of charging modules, each of which independently charges a battery unit and is provided with a positive port and a negative port with independent functions. The positive port is connected with the positive terminal of the battery unit corresponding to the charging module, and the negative port is connected with the negative terminal of the battery unit corresponding to the charging module.

Compared with the prior art, the balanced charging device provided by the embodiment of the disclosure has the following advantages:

The balanced charging device provided by the embodiment of the disclosure is provided with a plurality of charging modules, and a positive port and a negative port on each charging module, so that each charging module can charge a battery unit, thereby charging a plurality of battery units in series. Moreover, the positive port and negative port on each charging module are ports with independent functions, that is, there is no common wire between the positive port or negative port on each charging module and the negative port or positive port on other charging modules. So, each charging module can charge the corresponding battery unit independently, and effectively avoid the problem of frequent start and end of charging of the charging module corresponding to the battery unit that has been charged first, thus shortening the whole charging time.

In some embodiments, the charging module comprises charging units, each of which has the first connecting part and the second connecting part; the first connecting part of each charging unit is connected with the positive port of the charging module through the first connecting wire, and the second connecting part of each charging unit is connected with the negative port of the charging module through the second connecting wire.

It is possible to realize that the positive port and negative port of each charging module are independent by arranging the first connecting part and the second connecting part on the charging unit of the charging module, connecting the first connecting part with the positive port of the charging module through the first connecting wire, and connecting the second connecting part with the negative port of the charging module through the second connecting wire. In other words, the circuit of each charging module is independent, and there is no common wire between two adjacent charging modules.

In some embodiments, each charging module has a detection unit used for detecting the electrical parameter of the positive port or the negative port.

It is practical to use the charging module to detect the electrical parameter according to the detection unit, start charging the corresponding battery unit and stop charging the corresponding battery unit by arranging the detection unit and using the detection unit to detect the electrical parameter of the positive port or negative port.

In some embodiments, the electrical parameter is a voltage value.

By limiting the electrical parameter to the voltage value, it is practical to obtain the voltage value of the charging module accurately and quickly based on the detection, start charging the corresponding battery unit and stop charging the corresponding battery unit.

In some embodiments, each charging module has a charging management unit, which responds to the electrical parameter detected by the detection unit and controls the charging state of the charging unit.

By arranging a charging management unit in each charging module, it is practical to realize that each charging management unit only conducts the charging management on the corresponding battery unit. In this way, the management process of the charging management unit will be simple and convenient.

In some embodiments, the charging management unit is communicated with the detection unit via a bus.

By connecting the charging management unit and the detection unit through the bus, it is practical to realize that the electrical parameter detected by the detection unit can be transmitted to the charging management unit.

In some embodiments, the bus is any one of CAN, SPI, I2C and UART.

By limiting the bus to any one of CAN, SPI, I2C and UART, the embodiments of various buses are given, which is convenient for selecting the appropriate bus type according to the actual situation.

In some embodiments, the positive and negative ports of a plurality of charging modules are integrated together to form a balanced charging socket.

By integrating the positive and negative ports of a plurality of charging modules and forming a balanced charging socket, the balanced charging device can have more beautiful appearance, which is beneficial for its preparation.

The second aspect of the embodiment of the disclosure provides a charging system, which comprises an adapter and a balanced charging device in any of the above embodiments, and the adapter is used to supply power to the balanced charging device.

By supplying power to the balanced charging device through the adapter, the charging system provided by this embodiment can convert the mains power into electricity meeting the input requirements of the balanced charging device through the adapter so as to charge a plurality of battery units connected in series. Because the balanced charging device itself can shorten the charging time, the charging time of the charging system provided by this embodiment is also shortened.

In some embodiments, the charging system also includes a balanced charging adapter which is used for expanding the positive port into a plurality of positive sub-ports and the negative port into a plurality of negative sub-ports.

By arranging the balanced charging adapter, it is practical to expand the positive sub-ports and negative sub-ports, thus facilitating charging more battery units and improving the compatibility.

In addition to the above described technical problems solved by the embodiment of the disclosure, the technical features constituting the technical scheme and the beneficial effects brought by the technical features of these technical schemes, other technical problems that can be solved by the balanced charging device and charging system provided by the embodiment of the disclosure Other technical features included in the technical scheme and the beneficial effects brought by these technical features will be further described in detail in the specific embodiment.

BRIEF DESCRIPTION OF THE DRAWINGS

In order to more clearly explain the embodiment of the disclosure or the technical solution in the prior art, the drawings that need to be used in the embodiment or the brief description of the prior art will be introduced briefly below. It is apparent that the drawings described below are some embodiments of the disclosure. For those skilled in the art, without paying creative labor, they may also obtain other drawings from these drawings.

EXPLANATION OF THE REFERENCE SIGNS IN THE DRAWINGS

| | |
|---|---|
| 100: Balanced charging device; | 101: Charging module; |
| 102: Positive port; | 103: Negative port; |
| 104: Charging unit; | 105: First connecting part; |
| 106: Second connecting part; | 107: Balanced charging socket; |
| 108: Positive part; | 109: Negative part; |
| 110: Detection unit; | 111: Management unit; |
| 112: Charging system; | 113: Adapter; |
| 114: Balanced Charging Adapter | |
| 200: Battery unit; | 201: Common wire; |
| 202: Positive terminal; | 203: Negative terminal; |
| 300: First connecting wire; | 400: Second connecting wire. |

DESCRIPTION OF THE PREFERRED EMBODIMENTS

In order to make more apparent and understandable the above purpose, characteristics and advantages of the embodiment of the disclosure, the technical solution provided in the embodiment of the disclosure will be clearly and completely described below in combination with the drawings in the embodiment of the disclosure. Obviously, the described embodiments are only part of the embodiments of the disclosure, rather than all of the embodiments. Based on the embodiments of the disclosure, all other embodiments obtained by those technicians skilled in the art without creative labor fall within the scope of the disclosure as claimed.

Each embodiment or embodiment mode in the specifications is described in a progressive manner. Each embodiment focuses on the differences from other embodiments. The same and similar parts among embodiments may be referred to each other.

In the description of the specifications, the description referring to the terms "one embodiment", "some embodiments", "schematic embodiments", "examples", "specific examples", or "some examples" means that the specific characteristics, structures, materials or features described in combination with the embodiments or examples are included in at least one embodiment or example of the disclosure. In the specifications, the schematic expression of the above terms does not necessarily refer to the same embodiments or examples. Furthermore, the specific characteristics, structures, materials or features described may be combined in a suitable manner in any one or more embodiments or examples.

Figure 1:
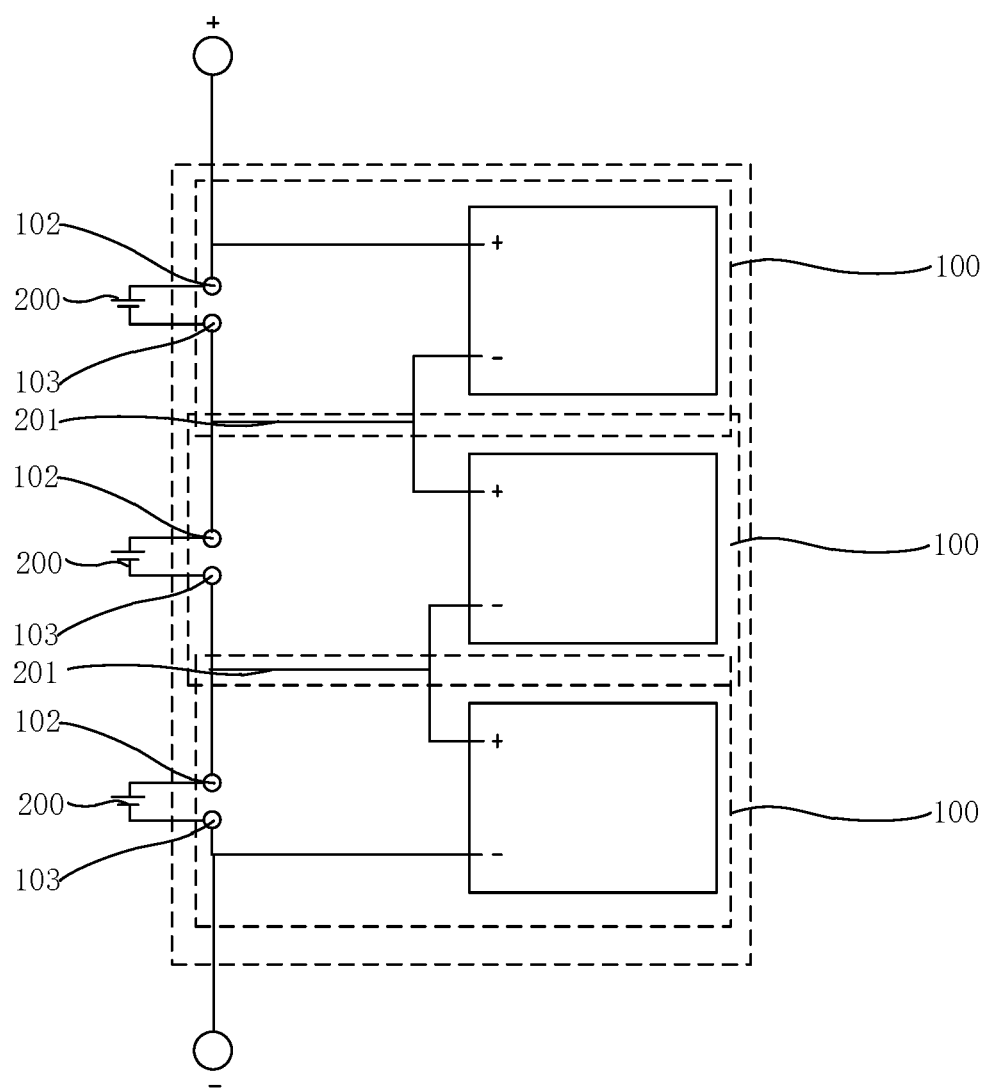
FIG. 1 is an assembly schematic diagram of a balanced charging device and a battery unit of the prior art.

As shown in FIG. 1, a balanced charging device in the prior art includes a plurality of charging modules 101, each of which is used to charge one battery unit 200. There is a common wire 201 in two adjacent charging modules 101, and such common wire is simultaneously connected with the positive port 102 of one charging module 101 and the negative port 103 of the other charging module 101.

However, the inventor of the disclosure has found that when the balanced charging device is used to charge the high-capacity battery unit 200, the conductor in the balanced charging device usually needs to be thickened, so as to increase the charging current on the conductor and shorten the charging time. However, upon actual charging, once the current increases, the voltage drop caused by the resistance on the common wire 201 will increase, which will directly affect the start and stop of the charging process of the battery unit 200. Specifically, when one of the battery units 200 corresponding to the two adjacent charging modules 101 using the common wire 201 is fully charged first, at this time, the charging module 101 corresponding to the first fully charged battery unit 200 will stop charging the first fully charged battery unit 200, and the charging module 101 corresponding to the non-fully charged battery unit 200 will continuously charge the non-fully charged battery unit 200. The voltage drop on the common wire 201 when two adjacent charging modules 101 charge the corresponding battery unit 200 at the same time is smaller than that on the common wire 201 when charging only the non-fully charged battery unit 200. Therefore, when only the non-fully charged battery unit 200 is charged, the charging module 101 corresponding to the first fully charged battery unit 200 will restart to charge the first fully charged battery unit 200 according to the voltage drop change. Once charging is started to the first fully charged battery unit 200, the voltage drop on the common wire 201 will return to the voltage drop when the two adjacent charging modules 101 charge the corresponding battery unit 200 simultaneously, and then stop charging the first fully charged battery unit 200. In this way, it starts again and again until the non-fully charged battery unit 200 is fully charged. This phenomenon will increase the time of the whole charging process, which is contrary to the original intention of shortening the charging time.

To this end, the embodiment of the disclosure provides a balanced charging device, which is also provided with a plurality of charging modules 101, and in which the common wire 201 as shown in FIG. 1 is not arranged between two adjacent charging modules 101. Instead, a positive port 102 and a negative port 103 with independent functions are arranged on each charging module 101. The battery unit 200 is charged through the positive port 102 and negative port 103 with independent functions to effectively shorten the charging time.

Figure 2:
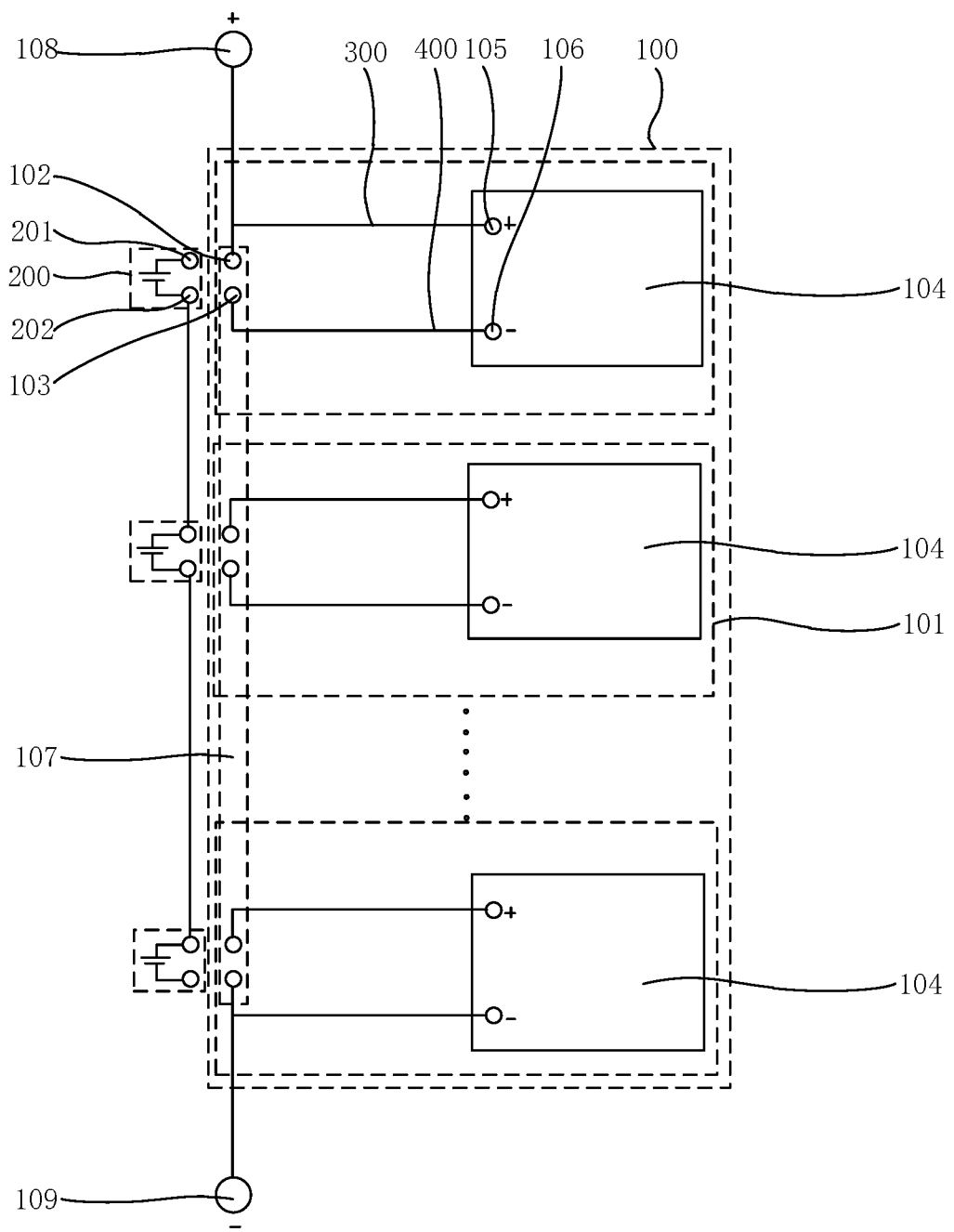
FIG. 2 is the schematic diagram of the charging system provided by the embodiment of the disclosure.
Figure 3:
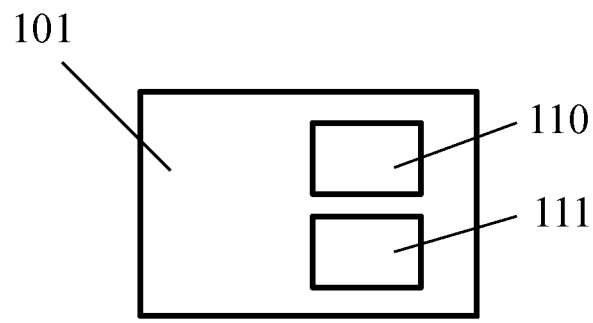
FIG. 3 is a diagram of a charging module in one contemplated embodiment.
Figure 4:
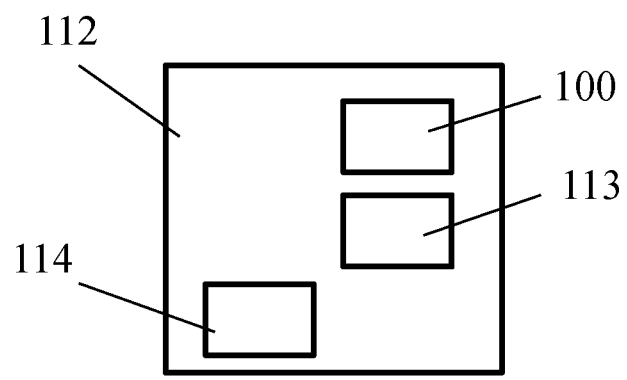
FIG. 4 is a diagram of a charging system in one contemplated embodiment.
Figure 5:
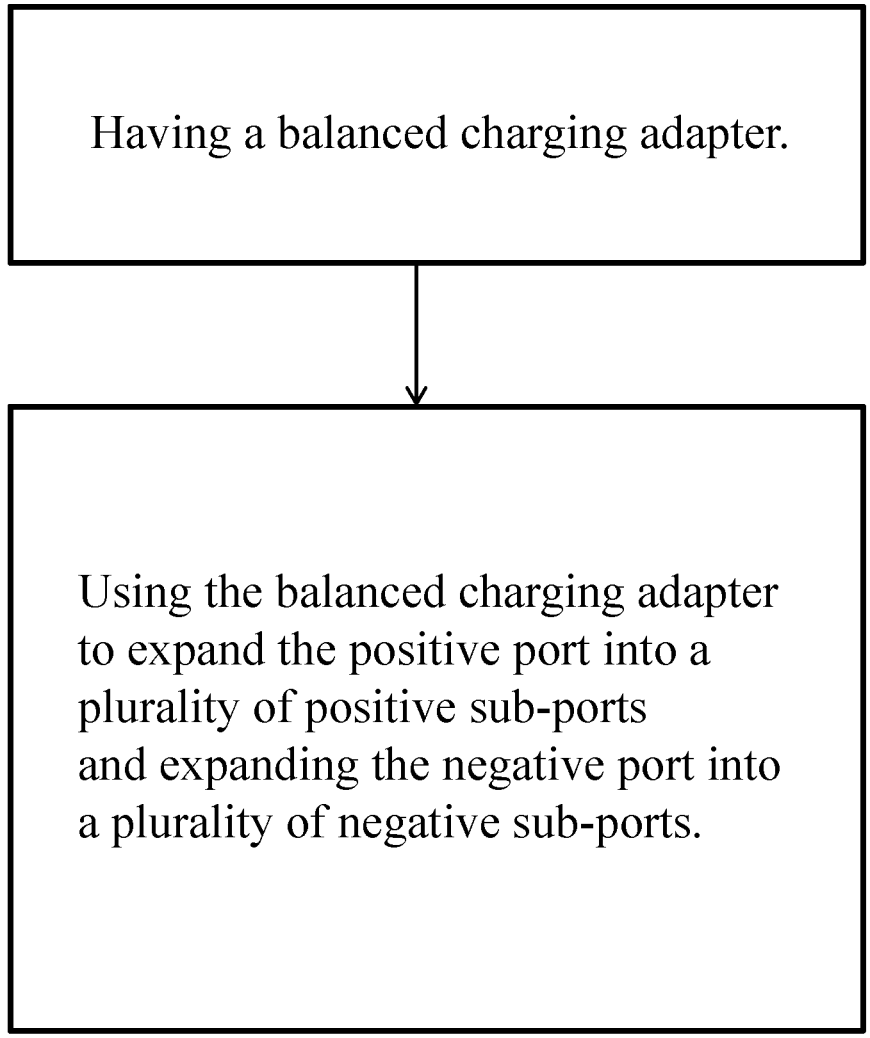
FIG. 5 is a diagram of method steps performed by a balanced charging adapter.

As shown in FIG. 2, the balanced charging device 100 of the embodiment of the disclosure is used to charge a plurality of battery units 200 in series. The battery unit 200 may be a single battery unit or a plurality of battery units connected in series.

As shown in FIG. 2, the balanced charging device 100 of this embodiment comprises: a plurality of charging modules 101, each of which independently charges a battery unit 200 and is provided with a positive port 102 and a negative port 103 with independent functions; the positive port 102 is connected to the positive terminal 202 of the battery unit 200 corresponding to the charging module 101, and the negative port 103 is connected to the negative terminal 203 of the battery unit 200 corresponding to the charging module 101. Wherein, each charging module 101 is provided with a positive port 102 and a negative port 103 with independent functions, which means that in the two adjacent charging modules 101, the positive port 102 of one charging module 101 and the negative port 103 of the other charging module 101 are not connected through the common wire 201 as shown in FIG. 1. In such case, each charging module 101 independently will charge the corresponding battery unit 200.

The balanced charging device 100 provided by the embodiment of the disclosure is provided with a plurality of charging modules 101, enables each charging module 101 to charge one battery unit 200 through a plurality of charging modules 101 arranged thereon and a positive port 102 and a negative port 103 arranged on the charging module 101, thus charging a plurality of battery units 200. Furthermore, the positive port 102 and the negative port 103 on each charging module 101 are ports with independent functions, that is, there is no common wire 201 as shown in FIG. 1 between the positive port 102 or the negative port 103 on each charging module 101 and the negative port 103 or the positive port 102 on other charging modules 101. Each charging module 101 independently charges the corresponding battery unit 200, which effectively avoids the problem of frequent start and end of charging of the charging module 101 corresponding to the first fully charged battery unit 200, thereby shortening the whole charging time.

As shown in FIG. 2, the charging module 101 includes a charging unit 104, each of which has the first connecting part 105 and the second connecting part 106; The first connecting part 105 of each charging unit 104 is connected with the positive port 102 of the charging module 101 through the first connecting wire 300, and the second connecting part 106 of each charging unit 104 is connected with the negative port 103 of the charging module 101 through the second connecting wire 400.

It is possible to realize that the positive port 102 and negative port 103 of each charging module 101 are independent by arranging the first connecting part 105 and the second connecting part 106 on the charging unit 104 of the charging module 101, connecting the first connecting part 105 with the positive port 102 of the charging module 101 through the first connecting wire 300, and connecting the second connecting part 106 with the negative port 103 of the charging module 101 through the second connecting wire 400. In other words, the circuit of each charging module 101 is independent, and there is no common wire 201 as shown in FIG. 1 between two adjacent charging modules 101.

In some embodiments, each charging module 101 can have a detection unit 110 used for detecting the electrical parameter of the positive port 102 or the negative port 103. It is practical to use the charging module 101 to detect the electrical parameter according to the detection unit 110, start charging the corresponding battery unit 200 and stop charging the corresponding battery unit 200 by arranging the detection unit 110 and using the detection unit 110 to detect the electrical parameter of the positive port 102 or negative port 103.

In some embodiments, the electrical parameter is a voltage value. By limiting the electrical parameter to the voltage value, it is practical to obtain the voltage value of the charging module 101 accurately and quickly based on the detection, start charging the corresponding battery unit 200 and stop charging the corresponding battery unit 200. The detection unit specifically includes, for example, a voltage sensor, which refers to a sensor that can sense the measured voltage and convert it into an available output signal.

In some embodiments, each charging module 101 has a charging management unit 111, which responds to the electrical parameter detected by the detection unit 110 and controls the charging state of the charging unit 104. By arranging a charging management unit 111 in each charging module 101, it is practical to realize that each charging management unit 111 only conducts the charging management on the corresponding battery unit 200. In this way, the management process of the charging management unit 111 will be simple and convenient. The specific example of the charging management unit 111 is a management chip on which a control program is pre-stored.

In some embodiments, the charging management unit is communicated with the detection unit via a bus. By connecting the charging management unit and the detection unit through the bus, it is practical to realize that the electrical parameter detected by the detection unit can be transmitted to the charging management unit. It is worth noting that each charging module 101 is provided with a charging management unit and a detection unit, which makes the communication between the detection unit and the charging management unit isolated from each other, resulting in good communication reliability.

In some embodiments, the example of the bus is any one of CAN, SPI, I2C and UART. Among them, CAN (English name: Controller Area Network) is an ISO international standardized serial communication protocol; SPI is a serial peripheral interface (English name: Serial Peripheral Interface), which is a high-speed, full duplex and synchronous communication bus; I2C bus is a simple, bidirectional two-wire synchronous serial bus developed by Philips company (English name: Philips); UART is Universal Asynchronous Receiver/Transmitter, which converts the data to be transmitted between serial communication and parallel communication. By limiting the bus to any one of CAN, SPI, I2C and UART, the embodiments of various buses are given, which is convenient for selecting the appropriate bus type according to the actual situation.

As shown in FIG. 2, the positive port 102 and negative port 103 of a plurality of charging modules 101 are integrated together to form a balanced charging socket 107. By integrating the positive port 102 and negative port 103 of a plurality of charging modules 101 and forming a balanced charging socket 107, the balanced charging device 100 can have more beautiful appearance, which is beneficial for its preparation and connection with the balanced charging adapter described subsequently.

In some embodiments, the positive port 102 and the negative port 103 in the balanced charging socket 107 may be, for example, a jack, the plug provided with a pin is led out on the corresponding battery unit 200 through a cable, and each battery unit 200 is inserted into the balanced charging socket 107 through the plug arranged thereon, so as to connect the battery unit 200 with the corresponding charging module 101. Of course, the positive port 102 and the negative port 103 in the balanced charging socket 107 may also be arranged as pins, and the plug provided with a jack is led out from the corresponding battery unit 200 through a cable. In this way, each battery unit 200 is inserted into the balanced charging socket 107 through the plug arranged thereon, and the battery unit 200 may also be connected with the corresponding charging module 101.

In some embodiments, the balanced charging device 100 is also provided with a charging input socket, which includes a positive part 108 and a negative part 109, both of which are used to connect with the adapter. A plurality of charging modules 101 are connected between the positive part 108 and the negative part 109. In this way, the mains power will flow to the charging module 101 of the balanced charging device 100 through the adapter, and then charge the battery unit 200.

In the balanced charging device provided by this embodiment, the difference between the maximum and minimum voltage of each battery unit 200 may be controlled within 4 mv, which means good charging balance. Especially when the high-capacity battery unit 200 is charged with large current, the charging balance is very good. In addition, the balanced charging device provided by the present embodiment can shorten the charging time by 2-10 times, thus greatly shortening the charging time.

The embodiment of the disclosure also provides a charging system 112, which comprises an adapter 113 and a balanced charging device 100 in any of the above embodiments, and the adapter 113 is used to supply power to the balanced charging device 100.

By supplying power to the balanced charging device 100 through the adapter, the charging system provided by this embodiment can convert the mains power into electricity meeting the input requirements of the balanced charging device 100 through the adapter so as to charge a plurality of battery units 200 connected in series. Because the balanced charging device 100 itself can shorten the charging time, the charging time of the charging system provided by this embodiment is also shortened.

In some embodiments, the charging system also includes a balanced charging adapter 114 which is used for expanding the positive port 102 into a plurality of positive sub-ports and the negative port 103 into a plurality of negative sub-ports. By arranging the balanced charging adapter 114, it is practical to expand the positive sub-ports and negative sub-ports, thus facilitating charging more battery units 200 and improving the compatibility.

During actual use, a plurality of battery units 200 may be installed together, and they may share a plug, which is provided with a plurality of jacks or pins matched with the positive port 102 and the negative port 103 on the balanced charging socket 107. It is worth noting that some jacks or pins on the plug are electrically connected with the battery cell of the battery unit 200, or some jacks or pins may not be connected with the battery cell of the battery unit 200, that is, some jacks and pins may actually be empty, which facilitates better connection with the balanced charging socket 107.

The charging system provided by this embodiment may charge a plurality of battery units 200 through the balanced charging adapter with strong compatibility. It is worth noting that the number of a plurality of battery units 200 needs to be less than the maximum number of battery units 200 connected in series supported by the charging system.

Finally, it should be noted that the above embodiments are only used to illustrate the technical solution of the disclosure, not to limit it. Although the disclosure has been described in detail with reference to the above embodiments, those skilled in the art should understand that they may modify the technical solution recorded in the above embodiments, or substitute equivalents for some or all of the technical characteristics. These modifications or substitutions do not cause the essence of the corresponding technical solution to digress from the scope of the technical solution of each embodiment of the disclosure.

What is claimed is:

1. A balanced charging device to charge a plurality of battery units in series, which is characterized by comprising:
a plurality of charging modules, each of which independently charges a battery unit from said plurality of battery units and is provided with a positive port and a negative port;
the positive port is connected with a positive terminal of the battery unit corresponding to the charging module, and the negative port is connected with a negative terminal of the battery unit corresponding to the charging module; and
wherein the positive and negative ports of each one of said plurality of charging modules are integrated together to form a balanced charging socket.

2. The balanced charging device according to claim 1, wherein the charging module comprises a plurality of charging units, and each charging unit has a first connecting part and a second connecting part;
the first connecting part of each charging unit is connected with the positive port of the charging module through a first connecting wire, and the second connecting part of each charging unit is connected with the negative port of the charging module through a second connecting wire.

3. The balanced charging device according to claim 2, wherein each charging module has a detection unit to detect an electrical parameter of the positive port or the negative port.

4. The balanced charging device according to claim 3, which is characterized in that the electrical parameter is a voltage value.

5. The balanced charging device according to claim 3, which is characterized in that each charging module has a charging management unit, which responds to the electrical parameter detected by the detection unit and controls a charging state of the charging unit.

6. The balanced charging device according to claim 5, which is characterized in that the charging management unit is communicated and connected with the detection unit through a bus.

7. The balanced charging device according to claim 6, which is characterized in that the bus is any one of CAN, SPI, I2C and UART.

8. A charging system which is characterized in that it comprises an adapter and the balanced charging device according to claim 1, and the adapter is used to supply power to the balanced charging device.

9. The charging system according to claim 8, which is characterized by further comprising a balanced charging adapter used for expanding the positive port into a plurality of positive sub-ports and expanding the negative port into a plurality of negative sub-ports.

* * * * *